US009952317B2

(12) United States Patent
Valois et al.

(10) Patent No.: US 9,952,317 B2
(45) Date of Patent: Apr. 24, 2018

(54) VEHICLE SENSOR CALIBRATION SYSTEM

(71) Applicant: Uber Technologies, Inc., San Francisco, CA (US)

(72) Inventors: Jean-Sebastien Valois, Pittsburgh, PA (US); David McAllister Bradley, Pittsburgh, PA (US); Adam Charles Watson, Wesford, PA (US); Peter Anthony Melick, Pittsburgh, PA (US); Andrew Gilbert Miller, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/166,538

(22) Filed: May 27, 2016

(65) Prior Publication Data
US 2017/0343654 A1 Nov. 30, 2017

(51) Int. Cl.
*G01S 17/00* (2006.01)
*G01S 7/497* (2006.01)
*G01S 17/93* (2006.01)
*G01S 17/08* (2006.01)

(52) U.S. Cl.
CPC .............. *G01S 7/497* (2013.01); *G01S 17/08* (2013.01); *G01S 17/936* (2013.01)

(58) Field of Classification Search
USPC ................... 701/23–28, 29.1–34.4
See application file for complete search history.

(56) References Cited

U.S. PATENT DOCUMENTS

| 5,012,745 | A | * | 5/1991 | Yamashita | B60S 13/02 |
| | | | | | 104/38 |
| 5,590,604 | A | * | 1/1997 | Lund | B61B 13/00 |
| | | | | | 104/124 |
| 5,598,783 | A | * | 2/1997 | Lund | B61B 13/00 |
| | | | | | 104/124 |
| 8,899,903 | B1 | * | 12/2014 | Saad | B65G 67/00 |
| | | | | | 320/109 |
| 9,201,424 | B1 | * | 12/2015 | Ogale | G06T 7/80 |

(Continued)

FOREIGN PATENT DOCUMENTS

| CN | 102494609 | 6/2012 |
| CN | 101959022 | 11/2012 |

(Continued)

OTHER PUBLICATIONS

Office Action in CN201480022190.5 dated Aug. 22, 2017.
Office Action in JP 2016-502343 dated Jan. 18, 2018.

*Primary Examiner* — Jonathan L Sample
(74) *Attorney, Agent, or Firm* — Mahamedi IP Law LLP

(57) ABSTRACT

A vehicle sensor calibration system can detect an SDV on a turntable surrounded by a plurality of fiducial targets, and rotate the turntable using a control mechanism to provide the sensor system of the SDV with a sensor view of the plurality of fiducial targets. The vehicle sensor calibration system can receive, over a communication link with the SDV, a data log corresponding to the sensor view from the sensor system of the SDV recorded as the SDV rotates on the turntable. Thereafter, the vehicle sensor calibration system can analyze the sensor data to determine a set of calibration parameters to calibrate the sensor system of the SDV.

19 Claims, 6 Drawing Sheets

(56) References Cited

U.S. PATENT DOCUMENTS

| | | | | |
|---|---|---|---|---|
| 9,224,053 | B1* | 12/2015 | Ferguson | G06K 9/00798 |
| 9,328,526 | B2* | 5/2016 | Shani | E04H 6/28 |
| 9,669,827 | B1* | 6/2017 | Ferguson | B60W 30/09 |
| 9,684,836 | B1* | 6/2017 | Ferguson | G06K 9/00798 |
| 9,696,722 | B1* | 7/2017 | Ulrich | G05D 1/0231 |
| 9,719,801 | B1* | 8/2017 | Ferguson | G01C 25/00 |
| 9,720,415 | B2* | 8/2017 | Levinson | G05D 1/0214 |
| 2002/0135468 | A1 | 9/2002 | Bos et al. | |
| 2004/0030474 | A1* | 2/2004 | Samuel | B60G 17/0185 |
| | | | | 701/36 |
| 2004/0148093 | A1* | 7/2004 | Tanaka | G01C 21/00 |
| | | | | 701/400 |
| 2005/0095092 | A1* | 5/2005 | Segal | E04H 6/245 |
| | | | | 414/263 |
| 2008/0039991 | A1* | 2/2008 | May | G05D 1/024 |
| | | | | 701/25 |
| 2010/0185353 | A1* | 7/2010 | Barwick | B60K 17/30 |
| | | | | 701/23 |
| 2011/0050855 | A1 | 3/2011 | Nobis et al. | |
| 2011/0184605 | A1* | 7/2011 | Neff | G05D 1/0231 |
| | | | | 701/25 |
| 2011/0241845 | A1* | 10/2011 | Sullivan | H01L 21/67294 |
| | | | | 340/10.42 |
| 2011/0245964 | A1* | 10/2011 | Sullivan | H01L 21/6773 |
| | | | | 700/228 |
| 2012/0239238 | A1* | 9/2012 | Harvey | G05D 1/0221 |
| | | | | 701/25 |
| 2013/0078063 | A1* | 3/2013 | Shani | E04H 6/28 |
| | | | | 414/253 |
| 2013/0166105 | A1* | 6/2013 | Wastel | E04H 6/24 |
| | | | | 701/2 |
| 2013/0190963 | A1* | 7/2013 | Kuss | B66F 9/063 |
| | | | | 701/23 |
| 2014/0041966 | A1* | 2/2014 | Healy | B66F 7/28 |
| | | | | 187/216 |
| 2014/0136414 | A1* | 5/2014 | Abhyanker | G06Q 50/28 |
| | | | | 705/44 |
| 2014/0277691 | A1* | 9/2014 | Jacobus | G06Q 10/087 |
| | | | | 700/216 |
| 2014/0286744 | A1* | 9/2014 | Shani | E04H 6/12 |
| | | | | 414/816 |
| 2016/0129917 | A1* | 5/2016 | Gariepy | G05D 1/0011 |
| | | | | 701/2 |
| 2016/0318415 | A1* | 11/2016 | Salasoo | B60L 11/1833 |
| 2017/0096138 | A1* | 4/2017 | Reiff | B60W 10/04 |
| 2017/0226765 | A1* | 8/2017 | Wastel | E04H 6/424 |

FOREIGN PATENT DOCUMENTS

| | | |
|---|---|---|
| CN | 103152518 | 6/2013 |
| CN | 103179339 | 6/2013 |
| CN | 203353019 | 12/2013 |
| CN | 103001428 | 5/2015 |
| CN | 102857592 | 12/2015 |
| CN | 103146355 | 2/2016 |
| EP | 1816514 | 8/2017 |
| JP | H09163197 | 12/1998 |
| JP | H09326032 | 6/1999 |
| JP | 2011088623 | 4/2001 |
| JP | 2005024463 | 1/2005 |
| JP | 2011123078 | 12/2010 |
| JP | 2014/053408 | 3/2014 |

* cited by examiner

VEHICLE SENSOR CALIBRATION SYSTEM

BACKGROUND

For typical calibration of self-driving vehicle (SDV) or autonomous vehicle (AV) sensor systems, each sensor is individually calibrated prior to installation to obtain measurement accuracy prior to installation. Thereafter, the sensor is mounted to the vehicle and further positional calibrations may be conducted.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
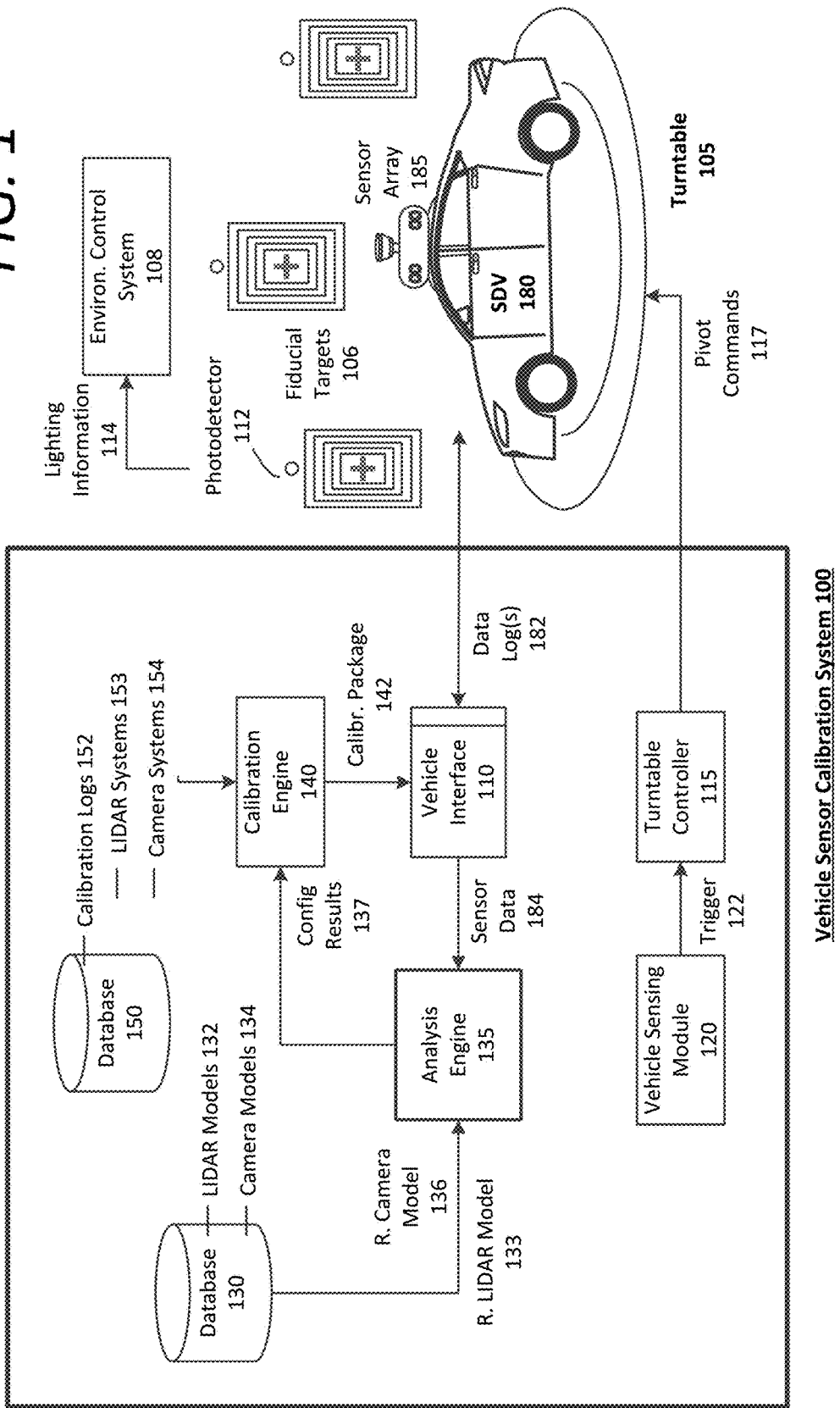
FIG. 1 is a block diagram illustrating an example vehicle sensor calibration system, as described herein.

Certain "full vehicle" calibration techniques of self-driving vehicle (SDV) sensor systems involve a complete accuracy and position calibration with all sensors in their final location on the SDV. The advantages of full vehicle calibration can include significant time savings, negating any potential alteration of the sensors during installation, and enabling recalibration after a period of time to quantify drift in the calibration parameters. However, current full vehicle calibration techniques can still be quite precarious and labor intensive, typically involving manual handling of a calibration array or manual setup of the calibration array to enable a human driver to manually drive the SDV to expose the sensor systems to the calibration array. Outdoor implementations involving human drivers can result in inconsistencies between sensor data collections due to, for example, inconsistent lighting conditions or inconsistent drive pattern by a human driver. Furthermore, manual calibration corresponding to a crew of technicians physically moving a calibration array around an SDV to provide full exposure of fiducials to the SDV's sensor system can also result inconsistent paths, speed, and orientation, which also results in inconsistent data collection. Such inconsistencies can result in an imperfect calibration of the SDV's sensor systems, which can impact on-board data processing and even safety.

Furthermore, an added challenge regarding full vehicle calibration is related to data collection. During data collection, all degrees of freedom must be observable in order to optimize depth, angles, distortions, scale, etc., due to their interrelatedness in the calibration process. As an example, to measure depth accuracy, the calibration may require that a target be observed at various depths in order to model parameters to be fitted properly to the acquired sensor data. Given the wide range of parameters to optimize during calibration, the data collection can become a daunting task, where precisely choreographed motions are required to position the sensors relative to fiducial targets.

To address the shortcomings of current calibration techniques, a vehicle sensor calibration system is described herein that can optimize certain sensor systems for self-driving vehicles (SDVs). The vehicle sensor calibration system can include a repeatable and mechanized sequence of pre-planned actions providing the sensor system of the SDV with a complete sensor view of a standardized environment. In various examples, the vehicle sensor calibration system includes a moveable or rotatable surface (e.g., a turntable) onto which SDVs can be positioned, and a plurality of fiducial targets disposed around the turntable to enable calibration of SDV sensor systems. The vehicle sensor calibration system can comprise an indoor room into which SDVs can drive to position themselves on the turntable. In particular, an indoor facility for the vehicle sensor calibration system can further include a controlled lighting system to provide consistent conditions for the sensor data collection. In certain aspects, the lighting conditions in the indoor facility may be initially optimized by the vehicle sensor calibration system in order to obtain most optimal signal to noise ratio on the various fiducial targets by the sensors. Once the SDV has been positioned on the turntable, a control mechanism of the turntable can rotate the turntable to enable the SDV to receive a full sensor view of the fiducial targets.

In some aspects, the vehicle sensor calibration system can operate to calibrate a suite of sensors of the SDV (e.g., LIDAR, single camera, stereo camera, radar, proximity sensors, etc.). For example, the vehicle sensor calibration system can provide SDVs with an ideal calibration environment in which each calibration session can result in consistent and normalized data collection from the SDV's sensor systems to run through mathematical models for each sensor system. In various implementations, the vehicle sensor calibration system can comprise an indoor facility into which an SDV drives onto the turntable surrounded by the fiducial markers or targets. According to some examples, the vehicle sensor calibration system can receive a data log corresponding to sensor data from the SDV that indicates the SDV entering the indoor facility, driving onto the turntable, rotating on the turntable to expose the sensor systems to the fiducial targets, and then driving off the turntable to exit the facility.

The vehicle sensor calibration system may then analyze the sensor data in the data log for calibration. According to examples provided herein, the sensor data comprises at least LIDAR data from one or more LIDAR sensors of the SDV. Additionally or alternatively, the sensor data can comprise camera data, or stereoscopic camera data from one or more cameras of the SDV. Other examples of sensor data from the SDV can include radar data from one or more radar systems of the SDV, proximity sensor data (e.g., from infrared sensors), sonar data from one or more acoustic sensors, and the like. For each sensor data set (e.g., for each type of sensor data and/or for each individual sensor of the SDV), the vehicle sensor calibration system can run a standardized mathematical model on the sensor data set to determine a set of calibration parameters in order to precisely calibrate the sensor. In certain aspects, the vehicle sensor calibration system implements a gradient descent technique as a first-order optimization in order to first compare the initial uncalibrated or misaligned sensor setup to an ideal or normalized sensor view represented by the mathematical models.

According to examples provided herein, the vehicle sensor calibration system can determine a set of calibration parameters for the sensor, which can comprise a number of adjustments to the individual sensor in order to match the sensor data from the sensor to the idealized sensor view represented by the mathematical model. Such adjustments can comprise alignment adjustments to a centralized field of view (e.g., re-centering a misaligned camera), angular range setting for a LIDAR laser strip, or directional adjustment to a LIDAR's photodetector array. Additionally or alternatively, the vehicle sensor calibration system can verify certain settings and/or provide settings specifications for a number of controllable parameters of the sensor. For example, for LIDAR systems, the set of calibration parameters can comprise adjustments to laser power settings, photodetector sensitivity settings, LIDAR strip settings, and the like. As another example, for camera or stereo camera systems, the vehicle sensor calibration system can verify and/or provide setting specifications for aperture settings, zoom settings, resolution, frame rate and/or shutter speed, color temperature settings, gain or ISO settings, saturation and contrast settings, focus, and the like.

In certain implementations, the vehicle sensor calibration system can provide the set as a calibration package to a human technician to enable manual adjustment of the SDV's sensor systems to perfect the calibration. In variations, the SDV can comprise a control system that can automatically make the adjustments based on the set of calibration parameters in the calibration package. Accordingly, in such implementations, the vehicle sensor calibration system can transmit the calibration package to the SDV to enable the SDV to auto-calibrate its sensor systems. Specifically, the set of calibration parameters can provide the SDV with precise settings for each controllable aspect of each sensor system. Thus, the set of calibration parameters can cause the SDV to make precise adjustments to the LIDAR system(s), the camera and/or stereo camera system(s), the radar system(s), proximity sensor system(s), etc. According to various examples, when adjustments are made to the SDV's sensor systems, a final calibration may be performed using the vehicle sensor calibration facility to confirm that alignment and settings are within precise tolerances.

Among other benefits, the examples described herein achieve a technical effect of optimizing calibration of SDV sensor systems for precision, accuracy, and also minimizing calibration time and labor. Furthermore, by standardizing SDV calibration with repeatable and consistent results, the vehicle sensor calibration system can make calibration and re-calibration of multiple SDV sensor systems routine and reliable. With accurate normalization of sensor calibration, SDVs can operate in normal public road conditions with optimal sensor settings to further optimize on-board sensor data processing.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs and SDVs. For example, some vehicles may enable automation in limited scenarios, such as on highways, provided that drivers are present in the vehicle. More advanced AVs and SDVs can drive without any human assistance from within or external to the vehicle.

System Description

FIG. 1 is a block diagram illustrating an example vehicle sensor calibration system, as described herein. The vehicle sensor calibration system 100 can be implemented as one or more computing systems in combination with a number of automated mechanisms and fiducial targets 106 to control or otherwise guide a self-driving vehicle (SDV) 180 through a precise and repeatable procedure in order to provide consistent and optimal calibration of the SDV's sensor systems. In some examples, the automated mechanism can comprise a conveyer system that locks the SDV 180 to a track, pulling it past a set of pre-placed fiducial targets. According to examples provided herein, the automated mechanism can comprise a turntable 105 onto which the SDV 180 is positioned to be rotated in place.

Figure 2:
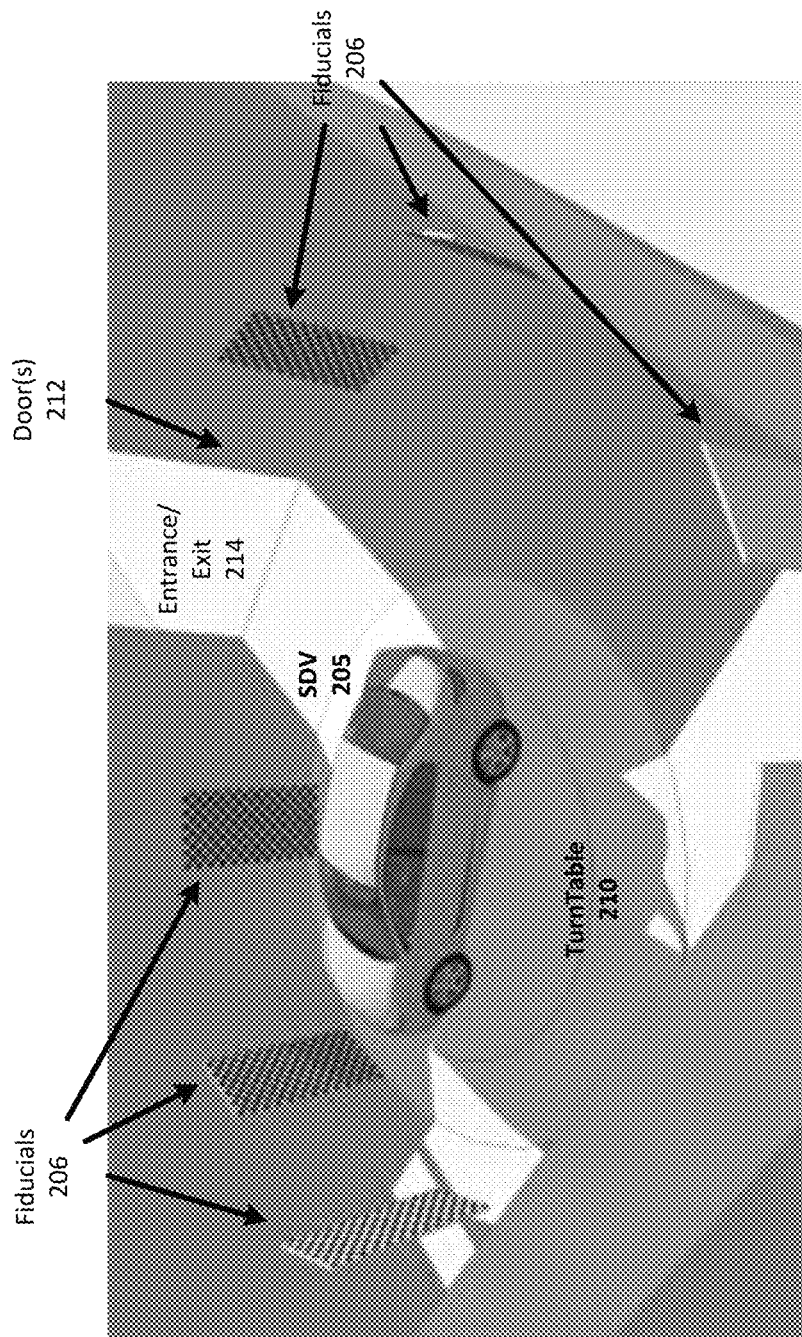
FIG. 2 depicts an SDV being rotated on a turntable of a vehicle sensor calibration facility.

In one example, the SDV 180 self-drives onto and off of the turntable 105. For example, the vehicle sensor calibration system 100 can comprise an indoor controlled environment (such as shown in FIG. 2), and can include an entrance/exit location (or separate entrance and exit locations) through which the SDV 180 can self-drive. In variations, the vehicle sensor calibration system 100 can include a combination conveyor system and turntable 105 to allow for automated control of the SDV 180 in entering, positioning, and exiting the vehicle sensor calibration system 100.

In some aspects, the vehicle sensor calibration system 100 can include a vehicle sensing module 120 that can generate a trigger 122 for a turntable controller 115 when the SDV 180 is properly positioned on the turntable 105. In certain variations, the vehicle sensing module 120 can comprise a number of sensors, such as pressure sensors or weight measurement sensors on the turntable itself, cameras positioned around the turntable, and the like, and/or can comprise a communication device(s) to exchange communications with the SDV 180. It is further contemplated that the vehicle sensing module 120 can trigger control of any mechanized system that directs the SDV 180 through a calibration sequence, such as a conveyor system, or a combination of conveyor system and turntable with fiducial targets 106 disposed throughout.

In many examples, the vehicle sensing module 120 can detects the SDV 180 on the turntable 105 and can generate the trigger 122 to cause the turntable controller 115 to generate pivot commands 117 executable to pivot the turntable 105 with the SDV 180 thereon. As the turntable 105 rotates, the sensor array 185 of the SDV 180 can be provided with a sensor view of the fiducial targets 106, which can be placed at various locations and distances around the turntable 105. Additional fiducial targets can be included for certain sensors (e.g., the LIDAR and stereo cameras) for entering and exiting the indoor facility.

According to examples described herein, the fiducial targets 106 can comprise specialized markers for calibrating the sensor array 185. In some implementations, vehicle sensor calibration system 100 can include separate specialized fiducial markers for the LIDAR systems and the camera systems. Additionally or alternatively, the fiducial targets 106 can each comprise a distinct pattern (e.g., a checkerboard pattern) to provide the LIDAR systems and camera systems with a standard data acquisition environment in order to run a calibration operation that can fuse the acquired data for each sensor with common sensor views represented by mathematical models. Thus, the vehicle sensor calibration system 100 can include an analysis engine 135 that can compare the acquired sensor data 184 from each of the sensors of the SDV's 180 sensor array 185 with sensor models stored in a database 130.

Furthermore, the vehicle sensor calibration system 100 can include an environment control system 108 to provide consistent and optimized environmental conditions for every calibration session. In one aspect, the environment control system 108 can optimize lighting conditions by receiving lighting information 114 from a number of photodetectors 112 included within the indoor facility. As an example, each fiducial target 106 can include a photodetector 112, which can provide lighting information 114 to the environment control system 108, which can adjust brightness in a targeted manner to ensure that the lighting conditions are the same for each fiducial target 106 over each respective SDV calibration procedure. Additionally, the environment control system 108 can include climate and/or temperature control to provide optimal temperature and/or humidity within the indoor facility through every calibration session. Thus, the environment control system 108 can provide precise environmental conditions—including lighting, temperature, humidity, etc.—to maximize signal to noise ratio for the sensor array 185 during calibration.

According to examples described herein, the vehicle sensor calibration system 100 can include a vehicle interface 110 to receive sensor data logs 182 from the SDVs 180 being calibrated. In some examples, the vehicle sensor calibration system 100 can access data logs 182 corresponding to the SDV 180 traveling in known environments with known landmarks, which can also be utilized as fiducial markers. As described below with respect to FIG. 3, SDVs may travel throughout a given region by dynamically comparing raw sensor data from on-board sensors (e.g., LIDAR and cameras) with prerecorded maps or sub-maps of the region. For example, the SDV can store sub-maps comprising processed LIDAR and/or stereo camera data of road segments that indicate static objects and landmarks to enable the SDV to perform localization and determine pose at any given location in the region. Furthermore, the SDVs can access and utilize current sub-maps (correlated to a current position of the SDV in the region) to compare with raw sensor data in order to dynamically identify any potential hazards or objects of interest, dynamically run a probabilistic analysis for each detected object of interest, and determine whether action is required to avoid an incident. Such sensor data comparisons between the sub-maps and the raw sensor data may be stored in data logs 182 of the SDV 180. According to examples provided herein, the vehicle sensor calibration system 100 can access such data logs 182, and in some examples, the analysis engine 135 can run an analysis or test to determine whether a misalignment or other anomaly exists on the SDV's 180 sensor array 185.

In certain implementations, the analysis engine 135 can identify configuration problems with the SDV's 180 sensor array 185 just by comparing the raw sensor data collected by the SDV 180, with the sub-map data stored on the SDV 180. Additionally or alternatively, the analysis engine 135 can collect one or more data logs 182 from the SDV 180 that correspond to the SDV 180 acquiring data within the vehicle sensor calibration system 100 facility. In one example, the analysis engine 135 collects a single data log 182 that include sensor data 184 acquired in connection with the SDV 180 at least one of entering the facility, rotating on the turntable 105, and/or exiting the facility.

As described herein, the vehicle sensor calibration system 100 can include a database 130 storing mathematical models for each sensor type (e.g., LIDAR, camera, radar, proximity, sonar) or for each individual sensor of each sensor type for individual sensor view comparison. For example, the SDV 180 can include multiple camera, stereo camera, and LIDAR systems each requiring individual calibration. For example, current SDVs in development include seven separate LIDAR sensors and over fifteen separate cameras, making manual calibration exceptionally labor and time intensive. Thus, in various implementations, the vehicle sensor calibration system 100 can store normalized mathematical models for each of the SDV's 180 sensor that represent a faultless or near faultless sensor view and configuration for that particular sensor. In many aspects, the database 130 can store LIDAR models 132 for calibrating the LIDAR sensors of the SDV 180, and camera models 134 for calibrating the cameras and/or stereoscopic cameras of the SDV 180.

In some aspects, the sensor data 184 can be streamed and analyzed by the analysis engine 135 in real time. In other aspects, the SDV 180 can transmit the data log(s) 182—corresponding to the sensor data acquisition exposing the sensors to the fiducial targets 106 while rotating on the turntable 105—to the vehicle interface 110 either via a wireless connection or a plug-in interface after sensor data acquisition. The analysis engine 135 can run the LIDAR sensor data from an individual LIDAR sensor of the SDV 180 through the respective LIDAR mathematical model 133 for that LIDAR sensor. Furthermore, the analysis engine 135 can run the camera data from an individual camera of the SDV 180 through the respective camera mathematical model 136 for that particular camera.

In further implementations, information from the vehicle motion system (e.g., the turntable 105 and/or conveyor system in alternative implementations) can be utilized by the vehicle sensor calibration system 100 as part of the calibration parameters optimization. For example, position, angle, and/or location data from the motion system can provide the vehicle sensor calibration system 100 with additional information to determine when certain sensors of the SDV 180 are activated throughout the calibration session. Thus, in many examples, the individual sensors of the SDV 180 may be activated when pointing at a particular fiducial target 106 and then deactivated when not. Accordingly, the amount of data recorded may be reduced, which can further optimize the calibration process.

In various aspects, each mathematical model can determine a configuration state of its corresponding sensor with respect to an ideal, common state. Thus, the configuration results 137 for each analyzed sensor of the SDV 180 can be generated by the analysis engine 135 and submitted to a calibration engine 140. The configuration results 137 can comprise the mathematical model results of running the sensor data 184—acquired by the sensor array 185 while SDV 180 is put through the predetermined calibration procedures (e.g., entering the facility, rotating on the turntable 105, and exiting the facility)—through the relevant mathematical models to provide a comparison between the current sensor configuration of the sensor array 185 and an idealized common sensor configuration represented by the models stored in the database 130. For example, the mathematical models for the SDV's 180 camera sensors can take three-dimensional points in the sensor field and project them onto image pixel coordinates. Additionally, the mathematical models for the SDV's 180 LIDAR sensors can take raw angular range measurements from the LIDAR sensors and project them onto three-dimensional positions in the world. The configuration results 137 can comprise a comparison between the ideal sensor views and/or configurations represented by the mathematical models and the actual uncalibrated data acquired by the sensors.

In certain aspects, the calibration engine 140 can process the configuration results 137 utilizing calibration logs 152 stored in a database 150. For example, the calibration logs 152 can provide the various configuration parameters of the individual LIDAR systems 153 and camera systems 154 of the SDV's 180 sensor array 185. For the LIDAR systems 153, such parameters can include LIDAR laser alignment settings (e.g., strip alignment), photodetector alignment, laser power settings, photodetector sensitivity settings, output frequency settings, and the like. For the camera systems 154, such parameters may include camera field of view and alignment settings, aperture settings, zoom settings, resolution, frame rate and/or shutter speed, color temperature settings, gain or ISO settings, saturation and contrast settings, focus, and the like.

According to certain examples, the calibration engine 140 can process the configuration results 137 for the entire suite of LIDAR sensors and the camera sensors (i.e., single lens and multiple lens systems) to generate a calibration 142 that comprises the individual adjustments to alignment and controllable parameters of the various sensors of the SDV's 180 sensor array 185. In certain examples, the calibration 142 may be utilized by technicians in order to make the manual adjustments to the sensor array 185. Additionally or alternatively, the calibration 142 can be transmitted to the SDV 180 via the vehicle interface 110 so that the SDV 180 can implement the calibration configurations. In certain implementations, the SDV 180 can include a control system that can self-calibrate sensor systems like the LIDAR sensors and camera sensors. For example, the LIDAR strips for each LIDAR sensor can be aligned with one or more actuators operable by the control system. As another example, the stereo camera systems can be motor-mounted and thus automatically adjusted by the control system. Additionally or alternatively, the control system of the SDV 180 can adjust the various configurable parameters of the LIDAR and camera systems described herein. Accordingly, the calibration 142 can comprise individual adjustments to be made to each of the sensor systems of the sensor array 185. In some aspects, the control system of the SDV 180 can utilize the calibration 142 to calibrate the sensor array 185 automatically.

FIG. 2 depicts an SDV being rotated on a turntable of a vehicle sensor calibration facility. In the below discussion with respect to FIG. 2, the vehicle sensor calibration system 100 as shown and described in FIG. 1 may be included to, for example, operate certain components of the vehicle sensor calibration facility 200 as shown in FIG. 2. For example, the turntable 210 and/or the door(s) 212 of the facility 200 may be operated via sensors (e.g., motion or pressure sensors) by the vehicle sensor calibration system 100 described with respect to FIG. 1. Furthermore, the vehicle sensor system 100 can be included as a component of the facility 200, or as a standalone system for use with any calibration environment. Referring to FIG. 2, an SDV 205 can include a sensor array (not shown) and can autonomously drive into the facility 200 via an entrance location 214. In certain implementations, the facility 200 can include one or more doors 212 that can close when the SDV 205 enters the facility 200 to ensure consistent lighting conditions. Still further, the temperature of the facility can be controlled in order to provide constant calibration conditions for multiple SDVs.

In variations, the facility 200 can include a conveyor system that guides or propels the SDV 205 into the facility 200. According to examples described herein, the facility 200 can include a plurality of fiducial targets 206 that can be sensed by the SDV's 205 sensor array as the SDV 205 rotates on the turntable 210. The fiducial targets 206 can act as standardized references for measurement. Thus, the vehicle sensor calibration system 100 can analyze the sensor data from the SDV 205 using the fiducials 206 as calibration references to determine a set of calibration parameters for the SDV's 205 sensor array. Specifically, the fiducials 206 provide standard targets to enable the vehicle sensor calibration system 100 to run the mathematical models for the SDV's 205 individual sensor systems to determine the calibration adjustments for those individual sensors.

Figure 3:
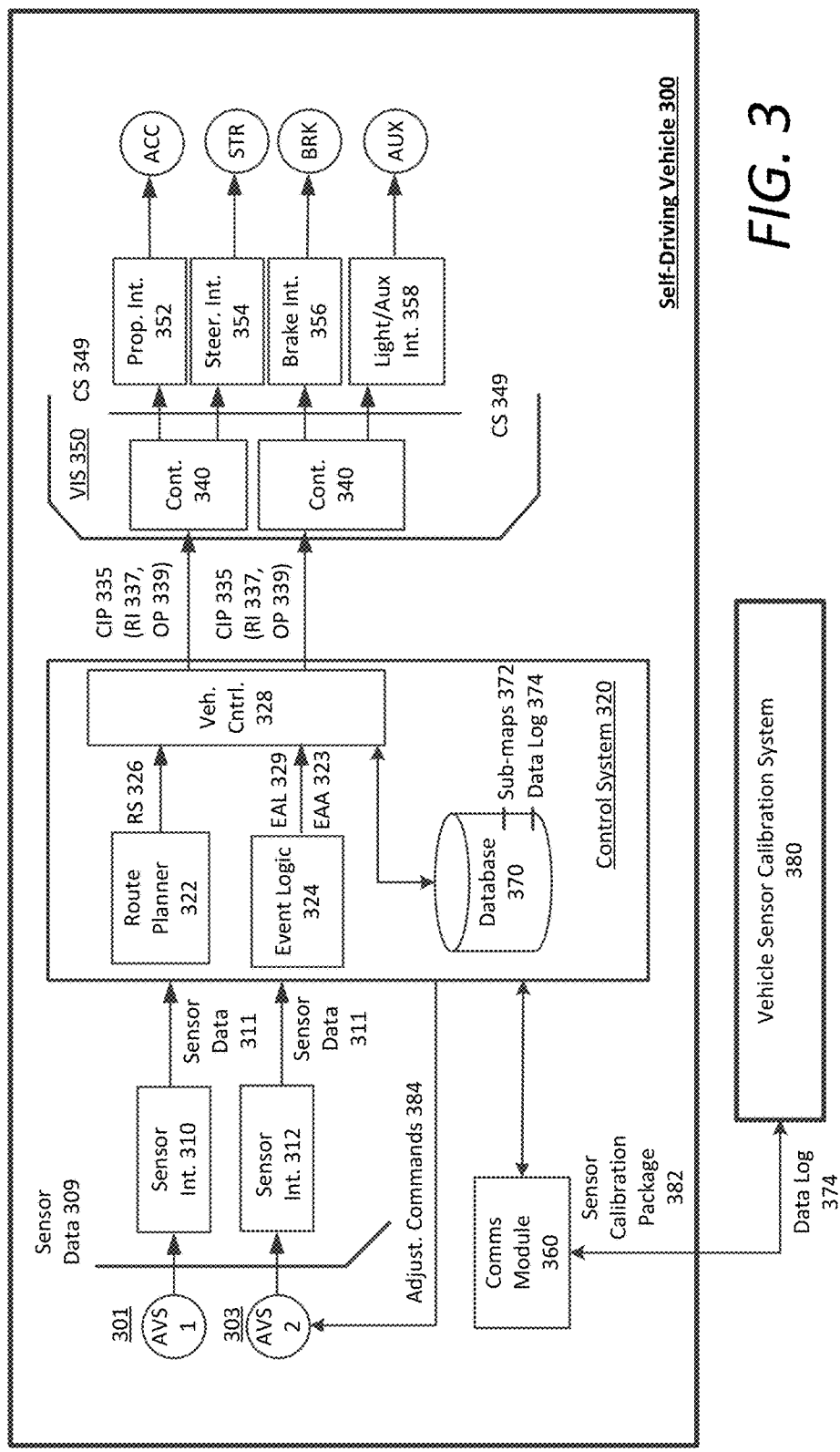
FIG. 3 is a block diagram illustrating an example autonomous vehicle (AV) or self-driving vehicle (SDV) implementing a control system, as described herein.

FIG. 3 is a block diagram illustrating an example AV or SDV implementing a control system, as described herein. In an example of FIG. 3, a control system 320 can autonomously operate the SDV 300 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously or manually.

According to some examples, the control system 320 can utilize specific sensor resources in order to intelligently operate the vehicle 300 in most common driving situations. For example, the control system 320 can operate the vehicle 300 by autonomously operating the steering, accelerating, and braking systems of the vehicle 300 as the vehicle progresses to a destination. The control system 320 can perform vehicle control actions (e.g., braking, steering, accelerating) and route planning using sensor information, as well as other inputs (e.g., transmissions from remote or local human operators, network communication from other vehicles, etc.).

In an example of FIG. 3, the control system 320 includes a computer or processing system which operates to process sensor data that is obtained on the vehicle 300 with respect to a road segment upon which the vehicle 300 operates. The sensor data can be used to determine actions which are to be performed by the vehicle 300 in order for the vehicle 300 to continue on a route to a destination. In some variations, the control system 320 can include other functionality, such as wireless communication capabilities, to send and/or receive wireless communications with one or more remote sources. In controlling the vehicle 300, the control system 320 can issue instructions and data, shown as commands 335, which programmatically control various electromechanical interfaces of the vehicle 300. The commands 335 can serve to control operational aspects of the vehicle 300, including propulsion, braking, steering, and auxiliary behavior (e.g., turning lights on).

The SDV 300 can be equipped with multiple types of sensors 301, 303 which can combine to provide a computerized perception of the space and the physical environment surrounding the vehicle 300. Likewise, the control system 320 can operate within the SDV 300 to receive sensor data 311 from the collection of sensors 301, 303, and to control various electromechanical interfaces for operating the vehicle 300 on roadways.

In more detail, the sensors 301, 303 operate to collectively obtain a complete sensor view for the vehicle 300, and further to obtain situational information proximate to the vehicle 300, including any potential hazards proximate to the vehicle 300. By way of example, the sensors 301, 303 can include multiple sets of cameras sensors 301 (video cameras, stereoscopic pairs of cameras or depth perception cameras, long range cameras), remote detection sensors 303 such as provided by radar or LIDAR, proximity or touch sensors, and/or sonar sensors (not shown).

Each of the sensors 301, 303 can communicate with the control system 320 utilizing a corresponding sensor interface 310, 312. Each of the sensor interfaces 310, 312 can include, for example, hardware and/or other logical components which are coupled or otherwise provided with the respective sensor. For example, the sensors 301, 303 can include a video camera and/or stereoscopic camera set which continually generates image data of the physical environment of the vehicle 300. As an addition or alternative, the sensor interfaces 310, 312 can include dedicated processing resources, such as provided with field programmable gate arrays (FPGAs) which can, for example, receive and/or process raw image data from the camera sensor.

In some examples, the sensor interfaces 310, 312 can include logic, such as provided with hardware and/or programming, to process sensor data 309 from a respective sensor 301, 303. The processed sensor data 309 can be outputted as sensor data 311. As an addition or variation, the control system 320 can also include logic for processing raw or pre-processed sensor data 309.

According to one implementation, the vehicle interface subsystem 350 can include or control multiple interfaces to control mechanisms of the vehicle 300. The vehicle interface subsystem 350 can include a propulsion interface 352 to electrically (or through programming) control a propulsion component (e.g., an accelerator actuator), a steering interface 354 for a steering mechanism, a braking interface 356 for a braking component, and a lighting/auxiliary interface 358 for exterior lights of the vehicle 300.

The controller(s) 340 can generate control signals 349 in response to receiving the commands 335 for one or more of the vehicle interfaces 352, 354, 356, 358. The controllers 340 can use the commands 335 as input to control propulsion, steering, braking, and/or other vehicle behavior while the SDV 300 follows a current route. Thus, while the vehicle 300 actively drives along the current route, the controller(s) 340 can continuously adjust and alter the movement of the vehicle 300 in response to receiving a corresponding set of commands 335 from the control system 320. Absent events or conditions which affect the confidence of the vehicle 320 in safely progressing along the route, the control system 320 can generate additional commands 335 from which the controller(s) 340 can generate various vehicle control signals 349 for the different interfaces of the vehicle interface subsystem 350.

According to examples, the commands 335 can specify actions to be performed by the vehicle 300. The actions can correlate to one or multiple vehicle control mechanisms (e.g., steering mechanism, brakes, etc.). The commands 335 can specify the actions, along with attributes such as magnitude, duration, directionality, or other operational characteristics of the vehicle 300. By way of example, the commands 335 generated from the control system 320 can specify a relative location of a road segment which the SDV 300 is to occupy while in motion (e.g., changing lanes, moving into a center divider or towards a shoulder, turning the vehicle, etc.). As other examples, the commands 335 can specify a speed, a change in acceleration (or deceleration) from braking or accelerating, a turning action, or a state change of exterior lighting or other components. The controllers 340 can translate the commands 335 into control signals 349 for a corresponding interface of the vehicle interface subsystem 350. The control signals 349 can take the form of electrical signals which correlate to the specified vehicle action by virtue of electrical characteristics that have attributes for magnitude, duration, frequency or pulse, or other electrical characteristics.

In an example of FIG. 3, the control system 320 can include a route planner 322, event logic 324, and vehicle control logic 328. The vehicle control logic 328 can convert alerts of event logic 324 ("event alert 329") into commands 335 that specify a set of vehicle actions. Furthermore, in operating the acceleration, braking, and steering systems of the SDV 300, the control system 320 can include a database 370 that stores previously recorded and processed sub-maps 372 of a given road segment or region. As described herein, the sub-maps 372 can comprise processed or normalized surface data that enables the control system 320 to compare with the sensor data 311 in order to identify any potential hazards or objects of interest.

Additionally, the route planner 322 can select one or more route segments 326 that collectively form a path of travel for the SDV 300 when the vehicle 300 is on a current trip (e.g., servicing a pick-up request). In one implementation, the route planner 322 can specify route segments 326 of a planned vehicle path which defines turn by turn directions for the vehicle 300 at any given time during the trip. The route planner 322 may utilize the sensor interface 312 to receive GPS information as sensor data 311. The vehicle control 328 can process route updates from the route planner 322 as commands 335 to progress along a path or route using default driving rules and actions (e.g., moderate steering and speed).

In certain implementations, the event logic 324 can trigger low level responses to detected events. A detected event can correspond to a roadway condition, obstacle, or object of interest which, when detected, poses a potential hazard or threat of collision to the vehicle 300. By way of example, a detected event can include an object in the road segment, heavy traffic ahead, and/or wetness or other environmental conditions on the road segment. The event logic 324 can use sensor data 311 from cameras, LIDAR, radar, sonar, or various other image or sensor component sets in order to detect the presence of such events as described. For example, the event logic 324 can detect potholes, debris, objects projected to be on a collision trajectory, and the like. Thus, the event logic 324 can detect events which enable the control system 320 to make evasive actions or plan for any potential hazards.

When events are detected, the event logic 324 can signal an event alert 329 that can classify the event and indicates the type of avoidance action to be performed. Additionally, the control system 320 can determine whether an event corresponds to a potential incident with a human driven vehicle, a pedestrian, or other human entity external to the SDV 300. In turn, the vehicle control 328 can determine a low level response based on a score or classification of the event. Such response can correspond to an event avoidance action 323, or an action that the vehicle 300 can perform to maneuver the vehicle 300 based on the detected event and its score or classification. By way of example, the vehicle response can include a slight or sharp vehicle maneuver for avoidance using a steering control mechanism and/or braking component. The event avoidance action 323 can be signaled through the commands 335 for controllers 340 of the vehicle interface subsystem 350.

When an anticipated dynamic object of a particular class does in fact move into position of likely collision or interference, some examples provide that event logic 324 can signal the event alert 329 to cause the vehicle control 328 to generate commands 335 that correspond to an event avoidance action 323. For example, in the event of an incident in the path of the vehicle 300, the event logic 324 can signal the event alert 329 to avoid a collision. The event alert 329 can indicate (i) a classification of the event (e.g., "serious" and/or "immediate"), (ii) information about the event, such as the type of object that generated the event alert 329, and/or information indicating a type of action the vehicle 300 should take (e.g., location of object relative to path of vehicle, size or type of object, etc.).

According to examples described herein, SDV 300 can include a communications module 360 to communicate with, among other things, the vehicle sensor calibration system 380, such as the vehicle sensor calibration system 100 described with respect to FIG. 1. Paramount to efficient and safe operation of the SDV 300 on public roads is the accurate calibration of the sensor systems 301, 303. As described herein, the SDV 300 can record sensor data while operating through the procedures of the vehicle sensor calibration system 380, and store the acquired sensor data in a data log 374. The sensor data in the data log 374 can comprise at least LIDAR and camera and/or stereo-camera data from the various sensor systems of the SDV 300 as the SDV 300 enters the vehicle sensor calibration facility 200, rotates on the turntable 210, and exits the facility 200. Furthermore, the sensor data in the data log 374 can include sensor views of the fiducial markers distributed in set positions within the facility 200.

In certain implementations, the SDV 300 can transmit the data log 374 to the vehicle sensor calibration system 380 via the communications module 360. As described herein, the vehicle sensor calibration system 380 can analyze the sensor data in the data log 374 using mathematical models in order to generate a sensor calibration package 382 that enables technicians to manually calibrate the SDV's 300 sensors, or enables the SDV 300 to self-calibrate the sensor systems. Accordingly, in some aspects, the vehicle sensor calibration system 380 can transmit the sensor calibration package 382 to the SDV 300. The control system 320 can utilize the sensor calibration package 382 to generate a set of adjustment commands 384 for each of the uncalibrated or misaligned sensors. The set of adjustment commands 384 can calibrate, for example, laser alignment, laser power, photodetector alignment, photodetector sensitivity, camera alignment or field of view settings, and the like.

Methodology

Figure 4:
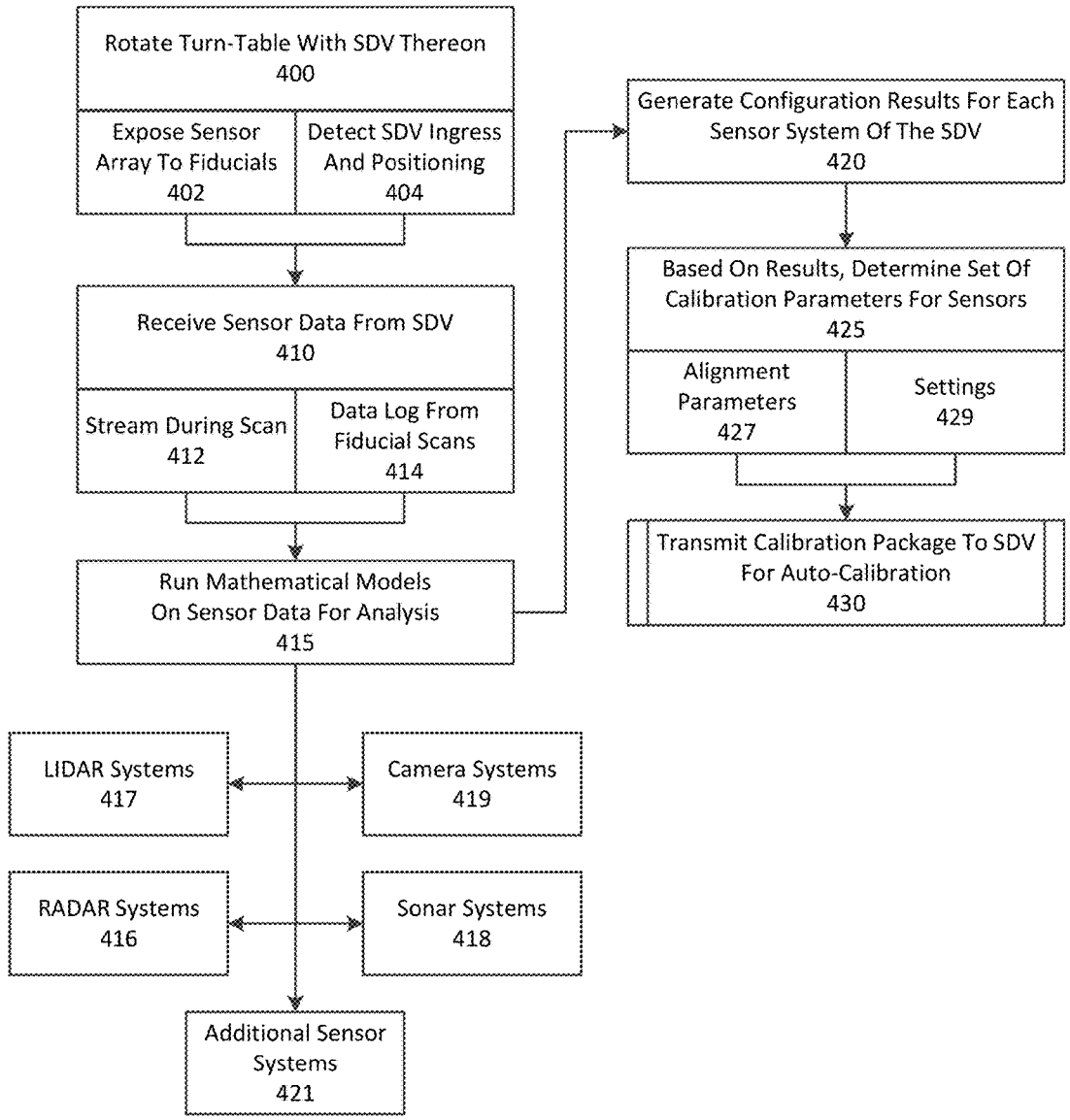
FIG. 4 is a flow chart describing an example method of implementing a data collection and calibration process for an SDV utilizing a vehicle sensor calibration system, according to examples described herein.

FIG. 4 is a flow chart describing an example method of implementing a data collection and calibration process for an SDV utilizing a vehicle sensor calibration system, according to examples described herein. In the below description of FIG. 4, reference may be made to reference characters representing like features as shown and described with respect to FIGS. 1-3. Furthermore, the method described in connection with FIG. 4 may be performed by an example vehicle sensor calibration system 100 as described with respect to FIG. 1. Referring to FIG. 4, the vehicle sensor calibration system 100 can rotate a turntable 105 having a SDV 180 positioned thereon (400). According to examples, rotation of the turntable 105 can expose the sensor array 185 of the SDV 180 to various fiducial targets 106 disposed around the turntable 105 (402). Furthermore, in some aspects, the execution of the turntable 105 can be performed in response to detecting the SDV 180 entering the vehicle sensor calibration facility 200 and being positioned atop the turntable 105 (404).

According to various aspects, the vehicle sensor calibration system 100 can receive sensor data 184 from the SDV 180 (410). In one example, the sensor data 184 is streamed to the vehicle sensor calibration system 100 for real time analysis (412). In variations, the vehicle sensor calibration system 100 can access a data log 182 corresponding to the sensor data scans of the fiducial targets 106 while in the facility 200 (414). The vehicle sensor calibration system 100 can then run the relevant mathematical models on the sensor data 184 (415). For example, the vehicle sensor calibration system 100 can store mathematical models representing ideal sensor configurations for each of the SDV's 180 LIDAR sensors systems and camera and/or stereo-camera systems. Thus, the vehicle sensor calibration system 100 can run the respective mathematical models on the sensor data acquired by each of the LIDAR systems (417), and each of the camera systems (419). In certain aspects, the mathematical models implement gradient descent alignment to calibrate each of the SDV's 180 sensor systems.

Additionally, the vehicle sensor calibration system 100 can store mathematical models for other sensor systems, such as radar, sonar, and infrared sensor systems. Thus, the vehicle sensor calibration system 100 can further run respective mathematical models for the SDV's 180 radar systems (416), sonar systems (418), and the various other sensor systems of the SDV 180 (421).

For each of the sensors of the SDV 180, the vehicle sensor configuration system 100 can generate configuration results 137 that provides a comparison between the current configuration of the sensor and an ideal common configuration represented by the mathematical model for that sensor (420). For example, the configuration results 137 for a particular LIDAR system can indicate a misalignment of certain individual lasers, the entire laser strip, individual photodetectors, and/or the photodetector array. Furthermore, in some aspects, the configuration results 137 can further indicate incorrect or uncalibrated settings of certain configurable parameters of the LIDAR system, such as power settings, frequency settings, and the like.

In certain implementations, based on the configuration results 137, the vehicle sensor calibration system 100 can determine a set of calibration parameters for each of the sensor systems of the SDV's 180 sensor array 185 (425). As described herein, the calibration parameters can include alignment parameters indicating adjustments required to calibrate the alignment of the sensor (e.g., a camera's field of view), or certain aspects of the sensor (e.g., lasers of a LIDAR system) (427). Additionally or alternatively, the calibration parameters can comprise settings adjustments to the various controllable aspects of the sensor, as described herein (429). Thus, calibration of the suite of sensors in the sensor array 185 using the various calibration parameters determined by the vehicle sensor calibration system 100 can provide the SDV 180 with an accurate ground truth for dynamic real-world analysis during operation in traffic and on public roads and highways. As described herein, the configuration results 137 and/or the calibration parameters based on the configuration results 137 can be utilized by human or robotic technicians in order to manually calibrate each of the sensors of the sensor array 185. As an addition or alternative, the calibration parameters for each of the sensor systems can be packaged in a calibration package 142, and transmitted to the SDV 180 for automatic calibration (430).

Hardware Diagrams

Figure 5:
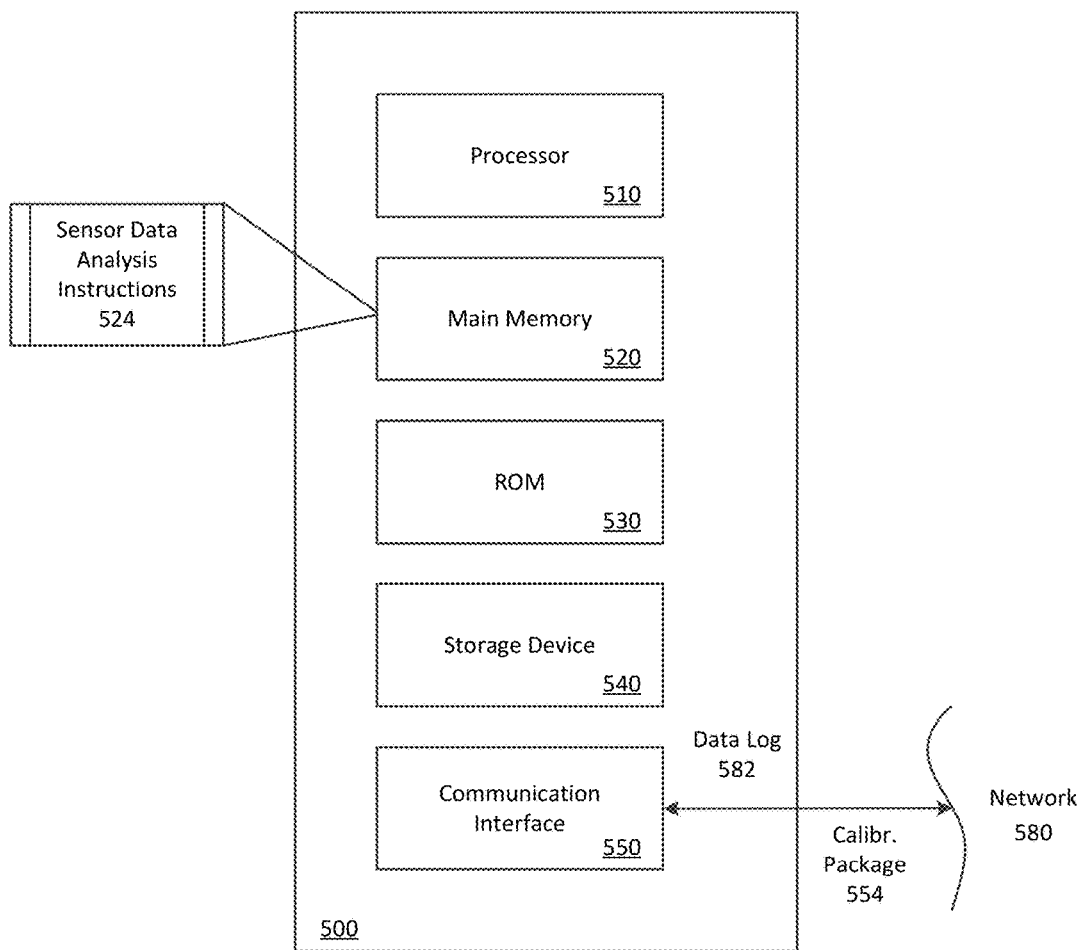
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services. In the context of FIG. 1, the vehicle sensor calibration system 100 may be implemented using a computer system 500 such as described by FIG. 5. The vehicle sensor calibration system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, one or more servers or an SDV 180. In accordance with examples, the computer system 500 can receive a data log 582 corresponding to the SDV 180 being run through a pre-planned sequence of motions (e.g., rotating on a turntable 105) that expose the sensors of the SDV 180 to a number of positioned fiducial markers 106. The executable instructions stored in the memory 520 can include sensor data analysis instructions 524, which the processor 510 can execute to analyze the sensor data in the data log 582 for calibration. Execution of the sensor data analysis instructions 524 can comprise running the sensor data in the data log 582 through individual mathematical models for each sensor type (e.g., LIDAR or camera), or for each individual sensor of each sensor type (e.g., main LIDAR, rear left corner stereo-camera, etc.). The configuration results for each data set corresponding to each sensor can be analyzed by the processor 510 to generate a calibration package 554. As described herein the calibration package 554 can be utilized for manual calibration or can be transmitted to the SDV 180 via the communication interface 550.

The processor 510 is configured with software and/or other logic to perform one or more processes, steps and other functions described with implementations, such as described in connection with FIGS. 1 through 4, and elsewhere in the present application.

Figure 6:
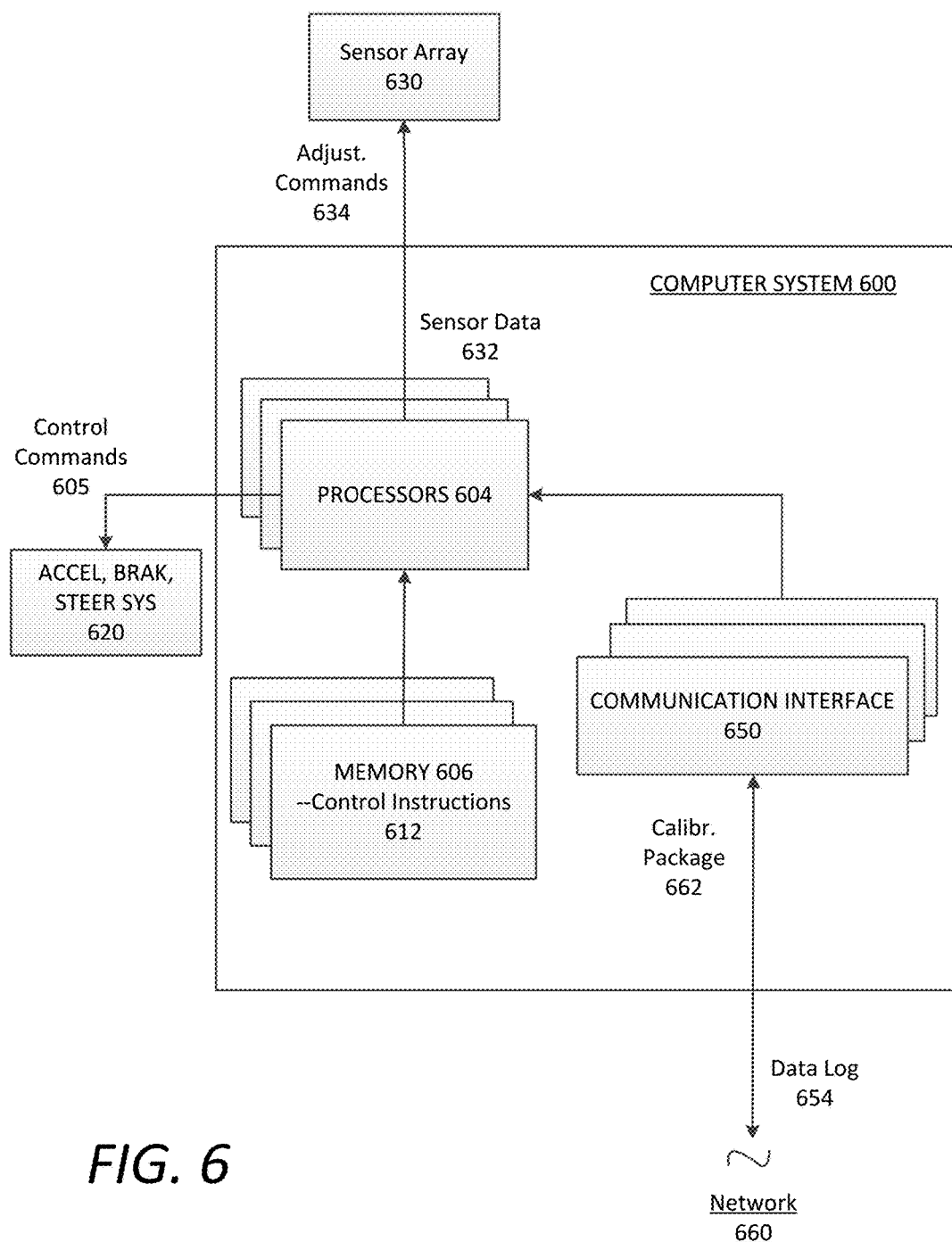
FIG. 6 is a block diagram illustrating a computing system for an AV or SDV upon which examples described herein may be implemented.

FIG. 6 is a block diagram illustrating a computer system upon which example SDV processing systems described herein may be implemented. The computer system 600 can be implemented using one or more processors 604, and one or more memory resources 606. In the context of FIG. 3, the control system 320 can be implemented using one or more components of the computer system 600 shown in FIG. 6.

According to some examples, the computer system 600 may be implemented within an autonomous vehicle or self-driving vehicle with software and hardware resources such as described with examples of FIG. 3. In an example shown, the computer system 600 can be distributed spatially into various regions of the SDV, with various aspects integrated with other components of the SDV itself. For example, the processors 604 and/or memory resources 606 can be provided in the trunk of the SDV. The various processing resources 604 of the computer system 600 can also execute control instructions 612 using microprocessors or integrated circuits. In some examples, the control instructions 612 can be executed by the processing resources 604 or using field-programmable gate arrays (FPGAs).

In an example of FIG. 6, the computer system 600 can include a communication interface 650 that can enable communications over one or more networks 660 with a vehicle sensor configuration system, such as those examples described with respect to FIG. 1. In one implementation, the communication interface 650 can also provide a data bus or other local links to electro-mechanical interfaces of the vehicle, such as wireless or wired links to and from the SDV control system 320, and can provide a network link to a transport system or calibration system over one or more networks 660.

The memory resources 606 can include, for example, main memory, a read-only memory (ROM), storage device, and cache resources. The main memory of memory resources 606 can include random access memory (RAM) or other dynamic storage device, for storing information and instructions which are executable by the processors 604. The processors 604 can execute instructions for processing information stored with the main memory of the memory resources 606. The main memory 606 can also store temporary variables or other intermediate information which can be used during execution of instructions by one or more of the processors 604. The memory resources 606 can also include ROM or other static storage device for storing static information and instructions for one or more of the processors 604. The memory resources 606 can also include other forms of memory devices and components, such as a magnetic disk or optical disk, for purpose of storing information and instructions for use by one or more of the processors 604.

According to some examples, the memory 606 may store a set of software instructions including, for example, control instructions 612. The control instructions 612 may be executed by one or more of the processors 604 in order to implement functionality such as described with respect to the SDVs herein. The computer system 600 can communicate a data log 654—corresponding to sensor data acquisition during a calibration procedure—to the vehicle sensor calibration system 100 over the network 660. As described herein, the vehicle sensor calibration system 100 can analyze the data log 654 using mathematical models to generate a calibration package 662. As provided herein, the communication interface 650 can receive the calibration package 662, which the processor 604 can utilize to generate adjustment commands 634 in order to calibrate the sensor array 630.

Furthermore, the processors 604 operate the acceleration, braking, and steering systems 620 along a current route, either determined locally via a mapping resource, or via information from a remote source. Thus, in executing the control instructions 612, the processor(s) 604 can receive sensor data 632 from the calibrated sensor array 630 to dynamically generate control commands 605 to autonomously operate the acceleration, braking, and steering systems 620 of the SDV 180 through road traffic on roads and highways.

While examples of FIGS. 5 and 6 provide for computing systems for implementing aspects described, some or all of the functionality described with respect to one computing system of FIGS. 5 and 6 may be performed by other computing systems described with respect to FIGS. 5 and 6.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A vehicle sensor calibration system for self-driving vehicles (SDVs) comprising:
   a turntable which an SDV can be driven onto;
   a plurality of fiducial targets positioned around the turntable to enable calibration of a sensor system of the SDV;
   a control mechanism to automatically rotate the turntable when the SDV is positioned on the turntable; and
   one or more computing systems that include one or more processors and one or more memory resources storing instructions that, when executed by the one or more processors, cause the one or more processors to:
   receive, over a communication link with the SDV, a data log corresponding to sensor data from the sensor system of the SDV recorded as the SDV rotates on the turntable; and
   analyze the sensor data to determine a set of calibration parameters to calibrate the sensor system.

2. The vehicle sensor calibration system of claim 1, wherein the vehicle sensor calibration system is provided in an indoor space, the vehicle sensor calibration system further comprising:
   an environment control system to maximize signal-to-noise ratio for the sensor system during calibration, the environment control system to optimize at least lighting conditions and temperature conditions within the indoor space.

3. The vehicle sensor calibration system of claim 1, wherein the executed instructions further cause the one or more processors to:
   transmit the set of calibration parameters to the SDV for automatic calibration of the sensor system.

4. The vehicle sensor calibration system of claim 1, wherein the executed instructions cause the one or more processors to analyze the sensor data by running one or more mathematical models on the sensor data, the one or more mathematical models representing a calibrated sensor configuration for the sensor system.

5. The vehicle sensor calibration system of claim 4, wherein the sensor system of the SDV comprises a plurality of LIDAR sensors and a plurality of camera sensors, and wherein the one or more mathematical models include a dedicated mathematical model for each of the plurality of LIDAR sensors and each of the plurality of camera sensors.

6. The vehicle sensor calibration system of claim 4, wherein the one or more mathematical models implement gradient descent on the sensor data to determine the set of calibration parameters for each respective sensor of the sensor system.

7. The vehicle sensor calibration system of claim 1, further comprising:
one or more detectors to detect a position of the SDV on the turntable;
wherein the control mechanism automatically rotates the turntable based on the one or more detectors detecting the position of the SDV on the turntable.

8. A method of calibrating a sensor system of a self-driving vehicle (SDV), the method being performed by one or more processors of a vehicle sensor calibration system and comprising:
detecting an SDV on a turntable;
in response to detecting the SDV on the turntable, rotating the turntable using a control mechanism to provide the sensor system of the SDV with a sensor view of a plurality of fiducial targets, the plurality of fiducial targets being positioned around the turntable at different locations;
receiving, over a communication link with the SDV, a data log corresponding to sensor data from the sensor system of the SDV recorded as the SDV rotates on the turntable; and
analyzing the sensor data to determine a set of calibration parameters to calibrate the sensor system of the SDV.

9. The method of claim 8, wherein the vehicle sensor calibration system is provided in an indoor space, and wherein the vehicle sensor calibration system comprises an environment control system to maximize signal-to-noise ratio for the sensor system during calibration, the environment control system to optimize at least lighting conditions and temperature conditions within the indoor space.

10. The method of claim 8, further comprising:
transmitting the set of calibration parameters to the SDV for automatic calibration of the sensor system.

11. The method of claim 8, the one or more processors analyze the sensor data by running one or more mathematical models on the sensor data, the one or more mathematical models representing a calibrated sensor configuration for the sensor system.

12. The method of claim 11, wherein the sensor system of the SDV comprises a plurality of LIDAR sensors and a plurality of camera sensors, and wherein the one or more mathematical models include a dedicated mathematical model for each of the plurality of LIDAR sensors and each of the plurality of camera sensors.

13. The method of claim 11, wherein the one or more mathematical models implement gradient descent on the sensor data to determine the set of calibration parameters for each respective sensor of the sensor system.

14. The method of claim 10, wherein the vehicle sensor calibration system comprises one or more detectors to detect a position of the SDV on the turntable, and wherein the one or more processors utilize the control mechanism to automatically rotate the turntable based on the one or more detectors detecting the position of the SDV on the turntable.

15. A non-transitory computer readable medium storing instructions that, when executed by one or more processors of a vehicle sensor calibration system, cause the one or more processors to:
detect an SDV on a turntable;
in response to detecting the SDV on the turntable, rotate the turntable using a control mechanism to provide the sensor system of the SDV with a sensor view of a plurality of fiducial targets, the plurality of fiducial targets being positioned around the turntable at different locations;
receive, over a communication link with the SDV, a data log corresponding to sensor data from the sensor system of the SDV recorded as the SDV rotates on the turntable; and
analyze the sensor data to determine a set of calibration parameters to calibrate the sensor system of the SDV.

16. The non-transitory computer readable medium of claim 15, wherein the executed instructions further cause the one or more processors to:
transmit the set of calibration parameters to the SDV for automatic calibration of the sensor system.

17. The non-transitory computer readable medium of claim 15, wherein the executed instructions cause the one or more processors to analyze the sensor data by running one or more mathematical models on the sensor data, the one or more mathematical models representing a calibrated sensor configuration for the sensor system.

18. The non-transitory computer readable medium of claim 17, wherein the sensor system of the SDV comprises a plurality of LIDAR sensors and a plurality of camera sensors, and wherein the one or more mathematical models include a dedicated mathematical model for each of the plurality of LIDAR sensors and each of the plurality of camera sensors.

19. The non-transitory computer readable medium of claim 18, wherein the one or more mathematical models implement gradient descent on the sensor data to determine the set of calibration parameters for each respective sensor of the sensor system.

* * * * *